(12) United States Patent
Gambardella et al.

(10) Patent No.: US 10,502,080 B2
(45) Date of Patent: Dec. 10, 2019

(54) ROTATING LABYRINTH M-SEAL

(71) Applicant: United Technologies Corporation, Hartford, CT (US)

(72) Inventors: David E. Gambardella, East Haven, CT (US); Nicholas W. Oren, Marlborough, CT (US)

(73) Assignee: United Technologies Corporation, Farmington, CT (US)

( * ) Notice: Subject to any disclaimer, the term of this patent is extended or adjusted under 35 U.S.C. 154(b) by 414 days.

(21) Appl. No.: 14/684,035

(22) Filed: Apr. 10, 2015

(65) Prior Publication Data
US 2016/0298481 A1 Oct. 13, 2016

(51) Int. Cl.
| | | |
|---|---|---|
| *F01D 11/02* | (2006.01) | |
| *F04D 29/08* | (2006.01) | |
| *F04D 29/32* | (2006.01) | |
| *F16J 15/447* | (2006.01) | |
| *F01D 5/22* | (2006.01) | |

(52) U.S. Cl.
CPC .............. *F01D 11/02* (2013.01); *F01D 5/225* (2013.01); *F04D 29/083* (2013.01); *F04D 29/321* (2013.01); *F16J 15/447* (2013.01); *F05D 2220/32* (2013.01); *F05D 2240/55* (2013.01); *F05D 2250/183* (2013.01); *F05D 2250/232* (2013.01); *F05D 2250/75* (2013.01); *F05D 2260/941* (2013.01); *Y02T 50/671* (2013.01)

(58) Field of Classification Search
CPC .... F16J 15/447; F16J 15/4472; F16J 15/4474; F16J 15/4476; F16J 15/4478; F16J 15/453
See application file for complete search history.

(56) References Cited

U.S. PATENT DOCUMENTS

| | | | | |
|---|---|---|---|---|
| 835,836 | A | * 11/1906 | Schulz | ..................... F01D 11/02 277/419 |
| 1,708,044 | A | * 4/1929 | Baumann | ............... F01D 11/001 277/418 |
| 3,257,119 | A | * 6/1966 | Bialkowski | .............. F16J 15/16 277/512 |
| 3,572,728 | A | 3/1971 | Smuland et al. | |
| 3,824,030 | A | 7/1974 | DeFeo | |
| 4,103,899 | A | 8/1978 | Turner | |
| 4,526,508 | A | 7/1985 | Antonellis et al. | |
| 5,143,383 | A | * 9/1992 | Glynn | .................. F16J 15/4472 277/412 |

(Continued)

FOREIGN PATENT DOCUMENTS

| | | | |
|---|---|---|---|
| FR | 2978793 A1 | 2/2013 | |
| WO | WO 2013132055 A1 * | 9/2013 | ............... F16J 15/44 |
| WO | WO2016059348 A1 | 4/2016 | |

OTHER PUBLICATIONS

EP search report for EP16164679.9 dated Aug. 16, 2016.
(Continued)

Primary Examiner — Kristina R Fulton
Assistant Examiner — L. Susmitha Koneru
(74) Attorney, Agent, or Firm — O'Shea Getz P.C.

(57) ABSTRACT

Aspects of the disclosure are directed to a seal associated with an engine of an aircraft. The seal includes a plurality of lands, and a barrel coupled to the lands and formed from a plurality of segments, where the segments are coupled to one another such that the barrel is substantially non-linear.

19 Claims, 3 Drawing Sheets

(56) References Cited

U.S. PATENT DOCUMENTS

| | | | |
|---|---|---|---|
| 5,211,535 A | 5/1993 | Martin et al. | |
| 5,960,625 A | 10/1999 | Zdvorak | |
| 6,682,077 B1 | 1/2004 | Letourneau | |
| 6,698,439 B2 | 3/2004 | Kamikawa | |
| 7,862,294 B2 | 1/2011 | Tiemann | |
| 8,167,547 B2* | 5/2012 | Wu | F01D 11/001 |
| | | | 277/418 |
| 8,734,020 B2 | 5/2014 | Ito | |
| 9,638,052 B2 | 5/2017 | Shorney | |
| 2003/0019163 A1* | 1/2003 | Dittel | E03F 5/02 |
| | | | 52/20 |
| 2005/0249590 A1 | 11/2005 | Marchi | |
| 2010/0021247 A1* | 1/2010 | Aldred | B65D 88/66 |
| | | | 406/19 |
| 2010/0158676 A1* | 6/2010 | Bottome | F01D 11/003 |
| | | | 415/174.4 |
| 2010/0209233 A1* | 8/2010 | Wilson | F01D 11/001 |
| | | | 415/173.7 |
| 2011/0018208 A1 | 1/2011 | Meller | |
| 2011/0253514 A1 | 10/2011 | Sun | |
| 2012/0027575 A1* | 2/2012 | Manzoori | F01D 11/02 |
| | | | 415/174.5 |
| 2014/0105732 A1 | 4/2014 | Luneau | |
| 2015/0001812 A1 | 1/2015 | Stefanis | |
| 2015/0330239 A1 | 11/2015 | Vo et al. | |
| 2016/0181629 A1* | 6/2016 | Choudhury | H01M 8/04208 |
| | | | 429/7 |
| 2017/0051621 A1* | 2/2017 | Ackermann | F01D 5/087 |

OTHER PUBLICATIONS

Wikipedia.org, "Labyrinth Seal", available at <http://en.wikipedia.org/wiki/Labyrinth_seal>, May 12, 2013.

Bernard L. Koff, "Gas Turbine Technology Evolution—A Designer's Perspective", AIAA-ICAS International Air and Space Symposium and Exposition: The Next 100 Y, AIAA 2003-2722, Dayton, Ohio, Jul. 14-17, 2003.

Raymond E. Chupp, "Turbomachinery Clearance Control", available at: <http://ntrs.nasa.gov/archive/nasa/casi.ntrs.nasa.gov/20070005016.pdf>, downloaded Feb. 24, 2015.

K.J. Pallos, "Gas Turbine Repair Technology", GE Power Systems, GER-3957B, available at: <http://site.ge-energy.com/prod_serv/products/tech_docs/en/downloads/ger3957b.pdf>, downloaded Feb. 24, 2015.

Office action for EP16164679.9 dated May 31, 2018.

* cited by examiner

ROTATING LABYRINTH M-SEAL

BACKGROUND

In connection with an aircraft engine, labyrinth seals are used to seal off cavities of higher and lower pressures in areas where there is relative rotational motion. Referring to FIG. 2A, a labyrinth seal 200 in accordance with the prior art is shown.

The seal 200 includes knife edges 201 that are used to create the sealing. The edges 201 rub against a variety of materials and may vary in terms of size, shape, count, angle, orientation, height, and width.

The seal 200 includes attachment lands 202a and 202b. The land 202a is forward of the land 202b. One or both of the lands 202a and 202b can be a tight or snap fit. The snaps can be scalloped to allow air flow through the snap.

The seal 200 includes segments 203a, 203b, and 203c (which, when taken collectively, are referred to as the barrel 203 herein). The barrel 203 extends from the forward attachment land 202-a in the aft direction.

The seal 200 includes a hammerhead 204. The hammerhead 204 may have multiple uses but in the context of this disclosure the hammerhead 204 is used to create a(nother) sealing cavity.

The seal 200 includes tabs 205. The tabs 205 are used to prevent rotation, thereby serving as an anti-rotation mechanism.

The seal 200 is subjected to stress and large thermal gradients when placed into operational use, leading to component fatigue and a reduction in terms of component lifetime. Such stress may be a result of the lands 202a and 202b being coupled to a large material mass (e.g., a disc—not shown in FIG. 2B), whereas the barrel 203 may be composed of a thin mass of material that interfaces to a hot airflow associated with a gas path. The large material mass/discs operate at a cooler temperature than the seal 200, and thus, do not grow as much as the seal 200 in a radially outboard direction (see the radial reference direction superimposed in FIG. 2A). Consequently, the barrel 203 may be compelled to deflect in the radial reference direction. The deflections could be large, potentially causing the barrel 203 to crack.

BRIEF SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure are directed to a seal associated with an engine of an aircraft, comprising: a plurality of lands, and a barrel coupled to the lands and formed from a plurality of segments, where the segments are coupled to one another such that the barrel is substantially non-linear. In some embodiments, the barrel is substantially 'M'-shaped. In some embodiments, at least one of the segments is of a non-uniform width. In some embodiments, at least one of the segments is tapered in terms of width. In some embodiments, the barrel is substantially symmetrical in terms of shape. In some embodiments, the barrel is substantially asymmetrical in terms of shape. In some embodiments, a first length associated with a first of the segments is different from a second length associated with a second of the segments. In some embodiments, a first orientation associated with a first of the segments is different from a second orientation associated with a second of the segments. In some embodiments, the seal further comprises a plurality of knife edges coupled to the plurality of segments. In some embodiments, a first of the plurality of segments and a second of the plurality of segments between the knife edges is substantially 'V'-shaped. In some embodiments, a first of the plurality of segments and a second of the plurality of segments between the knife edges is substantially 'U'-shaped. In some embodiments, the segments form a plurality of non-linear portions. In some embodiments, at least one of the lands is configured to couple to a disc, and the barrel is configured to interface to a gas path flow. In some embodiments, the seal is configured to seal a fluid between two or more cavities. In some embodiments, the lands are configured to interface a first section of the engine to a second section of the engine. In some embodiments, the seal is configured to interface a low pressure turbine and a high pressure turbine. In some embodiments, the seal is configured to interface a low pressure compressor and a high pressure compressor. In some embodiments, a ratio of a diameter of at least one of the lands to a length of the seal is within a range of 4:1 to 14:1. In some embodiments, a ratio of a diameter of at least one of the lands to a thickness of at least one of the segments is within a range of 240:1 to 500:1. In some embodiments, a ratio of a length of the seal to a height of at least one of the segments is within a range of 3:1 to 12:1. In some embodiments, a ratio of a length of the seal to a radius is within a range of 6:1 to 60:1. In some embodiments, a V-angle associated with the seal assumes a value within a range of forty degrees and one-hundred twenty degrees.

BRIEF DESCRIPTION OF THE DRAWINGS

The present disclosure is illustrated by way of example and not limited in the accompanying figures in which like reference numerals indicate similar elements.

DETAILED DESCRIPTION

Figure 1:
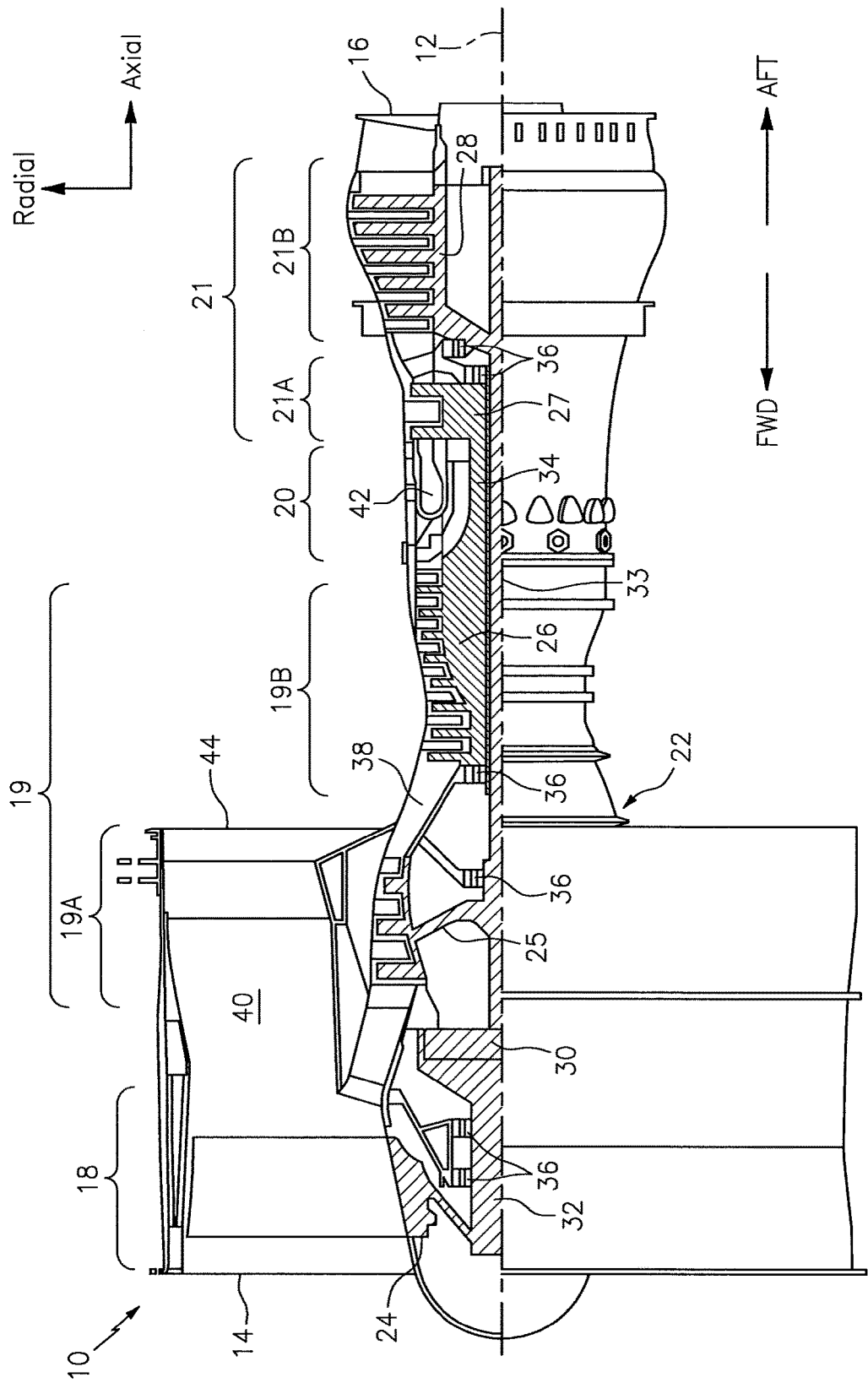
FIG. 1 is a side cutaway illustration of a geared turbine engine.

It is noted that various connections are set forth between elements in the following description and in the drawings (the contents of which are included in this disclosure by way of reference). It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities.

In accordance with various aspects of the disclosure, apparatuses, systems and methods are described for providing a seal, such as a labyrinth seal. At least a portion of the seal (e.g., a barrel of the seal) may include a plurality of segments, such that when the segments are taken as a whole the barrel may be substantially non-linear. In some embodiments, the barrel of the seal may be substantially shaped as the letter 'M' (in connection with the English language alphabet). The geometry of the seal may enable the seal to "spring" open on one or both ends of the seal when the seal rotates.

Aspects of the disclosure may be applied in connection with a gas turbine engine. FIG. 1 is a side cutaway illustration of a geared turbine engine 10. This turbine engine 10 extends along an axial centerline 12 between an upstream airflow inlet 14 and a downstream airflow exhaust 16. The turbine engine 10 includes a fan section 18, a compressor section 19, a combustor section 20 and a turbine section 21. The compressor section 19 includes a low pressure compressor (LPC) section 19A and a high pressure compressor (HPC) section 19B. The turbine section 21 includes a high pressure turbine (HPT) section 21A and a low pressure turbine (LPT) section 21B.

The engine sections 18-21 are arranged sequentially along the centerline 12 within an engine housing 22. Each of the engine sections 18-19B, 21A and 21B includes a respective rotor 24-28. Each of these rotors 24-28 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

The fan rotor 24 is connected to a gear train 30, for example, through a fan shaft 32. The gear train 30 and the LPC rotor 25 are connected to and driven by the LPT rotor 28 through a low speed shaft 33. The HPC rotor 26 is connected to and driven by the HPT rotor 27 through a high speed shaft 34. The shafts 32-34 are rotatably supported by a plurality of bearings 36; e.g., rolling element and/or thrust bearings. Each of these bearings 36 is connected to the engine housing 22 by at least one stationary structure such as, for example, an annular support strut.

During operation, air enters the turbine engine 10 through the airflow inlet 14, and is directed through the fan section 18 and into a core gas path 38 and a bypass gas path 40. The air within the core gas path 38 may be referred to as "core air". The air within the bypass gas path 40 may be referred to as "bypass air". The core air is directed through the engine sections 19-21, and exits the turbine engine 10 through the airflow exhaust 16 to provide forward engine thrust. Within the combustor section 20, fuel is injected into a combustion chamber 42 and mixed with compressed core air. This fuel-core air mixture is ignited to power the turbine engine 10. The bypass air is directed through the bypass gas path 40 and out of the turbine engine 10 through a bypass nozzle 44 to provide additional forward engine thrust. This additional forward engine thrust may account for a majority (e.g., more than 70 percent) of total engine thrust. Alternatively, at least some of the bypass air may be directed out of the turbine engine 10 through a thrust reverser to provide reverse engine thrust.

FIG. 1 represents one possible configuration for an engine 10. Aspects of the disclosure may be applied in connection with other environments, including additional configurations for an engine of an aircraft.

Figure 2A:
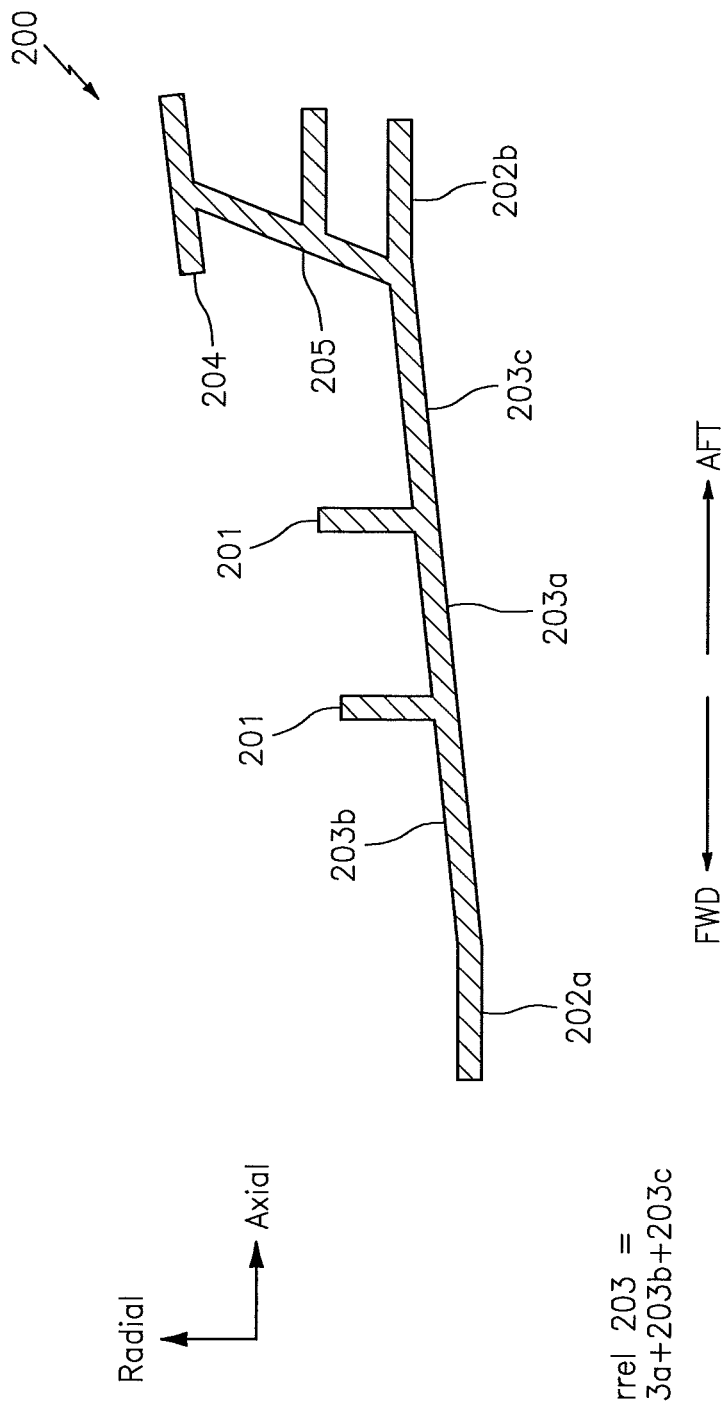
FIG. 2A illustrates a labyrinth seal in accordance with the prior art.
Figure 2B:
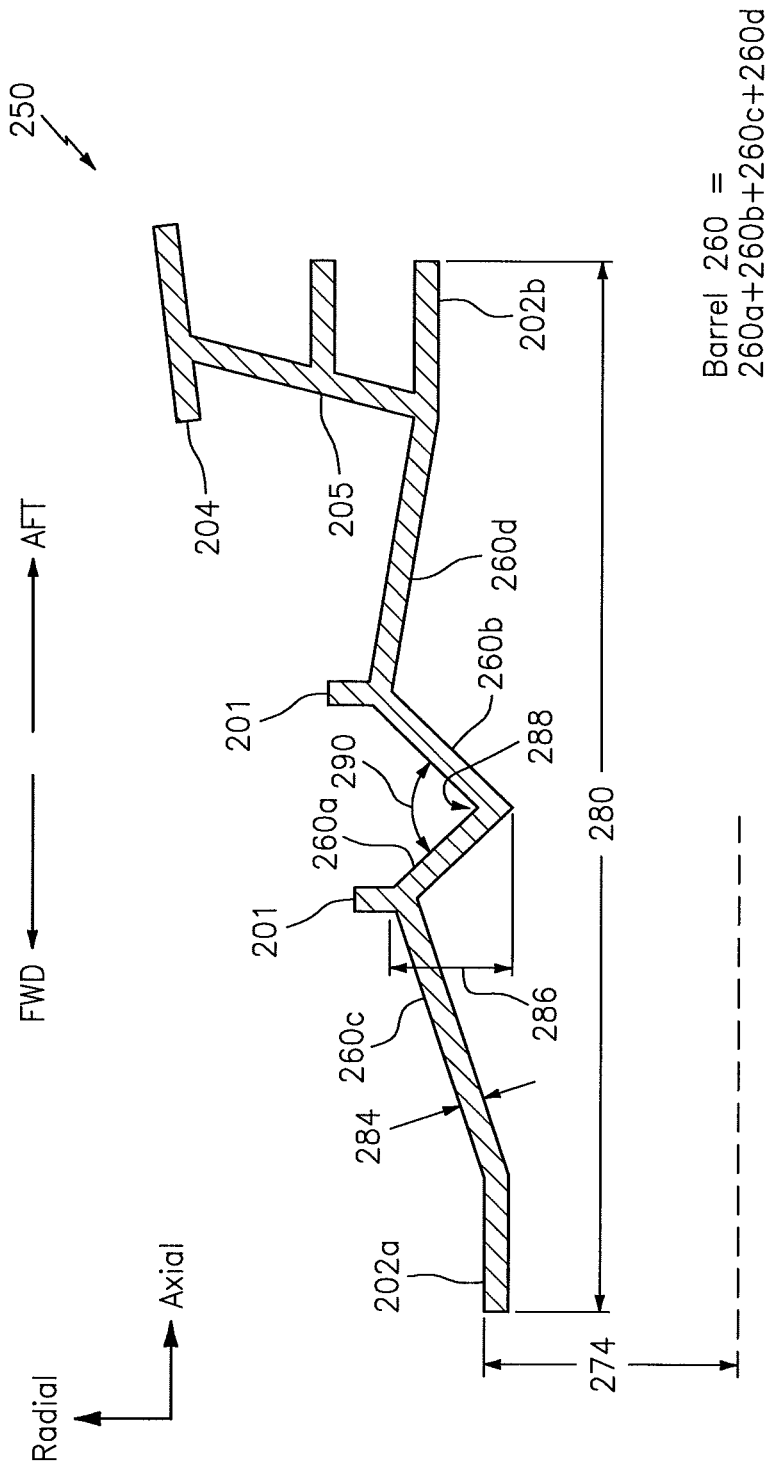
FIG. 2B illustrates a labyrinth seal in accordance with aspects of this disclosure.

Referring to FIG. 2B, an exemplary seal 250 in accordance with aspects of the disclosure is shown. The seal 250 includes many of the same components described above in connection with the seal 200 of FIG. 2A. As such, a complete re-description is omitted for the sake of brevity.

In terms of differences between the seal 200 and the seal 250, the barrel 203 of the seal 200 is generally linear between the lands 202a and 202b. For example, the barrel 203 is oriented substantially axially (e.g., is in the forward and aft directions) as shown in FIG. 2A. Conversely, the seal 250 may include barrel portions/segments 260a and 260b between the edges 201, a barrel segment 260c between the land 202a and the forward edge 201, and a barrel segment 260d between the aft edge 201 and the land 202b as shown in FIG. 2B. The barrel segments 260a-260d may form a barrel (collectively referred to herein as barrel 260).

One or more of the barrel segments 260a-260d may be substantially oriented in both the axial and radial reference directions as shown in FIG. 2B, such that the barrel segments 260a-260d, when taken as a whole, may be non-linear. As such, the seal 250 may adhere to a non-linear shaped geometry/configuration with respect to the barrel 260. For example, the barrel 260 may be substantially 'M'-shaped.

The use of the 'M'-shaped configuration for the seal 250 may enable the seal 250 to "spring" open on one or both ends of the seal when the seal 250 rotates. This spring effect may create a force balance that may reduce overall part stresses relative to conventional designs (e.g., the seal 200).

The portion of the barrel 260 formed by the segments 260a and 260b between the edges 201 may be substantially 'V'-shaped. The use of a 'U'-shape may provide for a high degree of clearance. In some embodiments, the portion of the barrel 260 formed by the segments 260a and 260b between the edges 201 may be substantially 'U'-shaped. The use of a 'U'-shape may make the seal 250 easier to manufacture (relative to the use of a 'V'-shape). Any shape or geometry may be used. Similar remarks apply to the interfaces/transitions between the barrel 260 segments 260c and 260a and between the barrel 260 segments 260b and 260d.

The barrel 260 may be substantially symmetrical (in terms of its shape/configuration) as shown in FIG. 2B. Asymmetrical shapes or configurations for the barrel 260 may be used in some embodiments. Such asymmetry may be the result of using a first length for a first of the segments (e.g., segment 260a) that is different from one or more other lengths of the other segments (e.g., segments 260b-260d), by providing the first segment with a different orientation (e.g., a different radial or axial projection) relative to an orientation of one or more of the other segments, etc.

In some embodiments, each of the segments 260a-260d may be of a uniform or constant width/thickness as shown in FIG. 2B. In some embodiments, one or more of the segments 260a-260d may be of a non-uniform width/thickness. For example, one or more of the segments 260a-260d may be tapered in terms of such a width/thickness.

While the seal 250 of FIG. 2B is illustratively shown as including a single 'M'-shaped barrel 260, in some embodiments a barrel may be formed from a plurality of 'M'-shapes or non-linear portions.

The shape of the seal 250 may be expressed as a function of one or more dimensions of the seal 250. For example, reference character 274 may reflect an attachment land diameter relative to engine centerline (e.g., centerline 12 of FIG. 1), reference character 280 may reflect a length of the seal 250, reference character(s) 284 may reflect a thickness of, e.g., one or more of the segments 260a-260d, reference character 286 may reflect a height of one or more of the segments (e.g., segments 260a or 260b), reference character 288 may reflect a radius (e.g., radii that make up peaks and troughs), and reference character 290 may reflect a (V−) angle.

In some embodiments, the attachment land diameter 274 to length 280 ratio may be within a range of 4:1 to 14:1. It is noted that the attachment lands 202a and 202b might not be at the same diameter (274).

In some embodiments, the attachment land diameter 274 to thickness 284 ratio may be within a range of 240:1 to 500:1 (including any tapering of one or more members). Using a ratio within this range may provide for seal barrel flexibility while still providing for an easy-to-manufacture seal in terms of, e.g., machining thin walled, large diameter parts.

In some embodiments, a length 280 to height 286 ratio may be within a range of 3:1 to 12:1. It is noted that the peak-to-trough pattern associated with height 286 might not be symmetric about any point/plane, the knife edges 201 might not be at the same diameter, and the knife edges 201 may be at any spacing in between the attachment lands 202a and 202b.

In some embodiments, the length 280 to radius 288 ratio may be within a range of 6:1 to 60:1.

In some embodiments, the angle 290 may assume a value within a range of forty degrees to one-hundred twenty degrees.

In a conventional rotating seal design, such as for example in connection with the seal 200, there may be high tensile stresses on the outer diameter (OD) of the seal 200 and high compressive stresses on the inner diameter (ID) because the seal 200 is trying to bow (radially) outboard at its mid-span. Conversely, in using the seal 250, as rotational speed increases, a portion of the seal 250 or the barrel 260 (e.g., the segments 260a and 260b) may try to expand (radially) outboard which may place an axial force on the lands 202a and 202b. Assuming these axial forces are limited in terms of the movement imposed on the lands 202a and 202b, the tendency to expand outboard may be prevented/minimized and the OD tensile stress may be reduced/minimized. One or more of the stresses described above may be driven by an axial bending field. For example, tensile/compressive stresses may be driven by the axial bending field.

Aspect of the disclosure may be used to interface or seal a first section of an engine to a second section of the engine. For example, in some embodiments a seal may be used to interface two or more of: a low pressure turbine, a high pressure turbine, a low pressure compressor, a high pressure compressor, etc. The lands may be used to provide for such an interface.

Technical effects and benefits of this disclosure include an enhancement or extension of one or more component or device lifetimes by reducing/minimizing stress concentrations. In some embodiments, a seal may be configured with a shape or geometry that provides for a reduction in terms of stress (e.g., OD tensile stress). Aspects of the disclosure may be applied in connection with an engine of an aircraft. For example, aspects of the disclosure may be applied in connection with turbine or compressor hardware. Aspects of the disclosure may be applied in connection with machinery (e.g., rotating machinery) that is configured to seal a fluid between two or more cavities.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps described in conjunction with the illustrative figures may be performed in other than the recited order, and that one or more steps illustrated may be optional in accordance with aspects of the disclosure.

What is claimed is:

1. A seal for a gas turbine engine, comprising:
   a plurality of lands;
   a barrel coupled to the lands and formed from a plurality of segments; and
   a plurality of knife edge seals coupled to the plurality of segments, the plurality of knife edge seals extending in a first radial direction so that at least one knife edge seal of the plurality of knife edge seals is disposed radially above at least one land of the plurality of lands,
   where the segments are coupled to one another such that the barrel is substantially non-linear,
   wherein a first of the plurality of segments and a second of the plurality of segments between the knife edge seals together form a 'V'-shape, the 'V'-shape extending in a second radial direction so that a peak of the 'V'-shape is disposed radially below at least one land of the plurality of lands, and where the barrel is substantially 'M'-shaped, and
   wherein the seal is configured to open on both of a first end and an opposing second end of the seal when the seal rotates.

2. The seal of claim 1, wherein at least one of the segments is of a non-uniform width.

3. The seal of claim 1, wherein at least one of the segments is tapered in terms of width.

4. The seal of claim 1, wherein the barrel is substantially symmetrical in terms of shape.

5. The seal of claim 1, wherein the barrel is substantially asymmetrical in terms of shape.

6. The seal of claim 5, wherein a first length associated with a first of the segments is different from a second length associated with a second of the segments.

7. The seal of claim 5, wherein a first orientation associated with a first of the segments is different from a second orientation associated with a second of the segments.

8. The seal of claim 1, wherein the segments form a plurality of non-linear portions.

9. The seal of claim 1, wherein the lands are configured to interface a first section of the engine to a second section of the engine.

10. The seal of claim 9, wherein the seal interfaces a low pressure turbine section and a high pressure turbine section.

11. The seal of claim 9, wherein the seal interfaces a low pressure compressor section and a high pressure compressor section.

12. The seal of claim 1, wherein a ratio of a diameter of at least one of the lands to a length of the seal is within a range of 4:1 to 14:1.

13. The seal of claim 12, wherein a ratio of a diameter of at least one of the lands to a thickness of at least one of the segments is within a range of 240:1 to 500:1.

14. The seal of claim 1, wherein a ratio of a length of the seal to a height of at least one of the segments is within a range of 3:1 to 12:1.

15. The seal of claim 1, wherein a ratio of a length of the seal to a radius is within a range of 6:1 to 60:1.

16. The seal of claim 1, wherein a V-angle associated with the seal assumes a value within a range of forty degrees and one-hundred twenty degrees.

17. The seal of claim 1, wherein the gas turbine engine has an axial centerline, and wherein the seal opens axially with respect to the centerline on the first end of the seal when the seal rotates.

18. The seal of claim 1, wherein the seal springs open when the seal rotates.

19. The seal of claim 14, wherein a ratio of a length of the seal to a radius is within a range of 6:1 to 60:1.

* * * * *